(12) United States Patent
Yasumoto et al.

(10) Patent No.: US 7,646,986 B2
(45) Date of Patent: Jan. 12, 2010

(54) OPTICAL RECEIVING DEVICE AND OPTICAL RECEIVING METHOD

(75) Inventors: Hideo Yasumoto, Osaka (JP); Hiroyuki Sasai, Osaka (JP)

(73) Assignee: Panasonic Corporation, Osaka (JP)

( * ) Notice: Subject to any disclaimer, the term of this patent is extended or adjusted under 35 U.S.C. 154(b) by 478 days.

(21) Appl. No.: 11/790,448

(22) Filed: Apr. 25, 2007

(65) Prior Publication Data
US 2007/0280694 A1 Dec. 6, 2007

(30) Foreign Application Priority Data
Apr. 27, 2006 (JP) .............................. 2006-124300

(51) Int. Cl.
*H04B 10/00* (2006.01)
(52) U.S. Cl. ................... 398/156; 398/158; 398/119; 398/122; 398/123; 398/131
(58) Field of Classification Search .............. 398/156, 398/158, 159, 119, 122, 123, 131
See application file for complete search history.

(56) References Cited

U.S. PATENT DOCUMENTS

| | | | | |
|---|---|---|---|---|
| 5,627,669 | A * | 5/1997 | Orino et al. ................... | 398/129 |
| 6,335,811 | B1 * | 1/2002 | Sakanaka ..................... | 398/129 |
| 6,507,424 | B2 * | 1/2003 | Sakanaka ..................... | 398/129 |
| 6,744,991 | B1 * | 6/2004 | Cao ............................. | 398/147 |
| 7,058,306 | B1 * | 6/2006 | Smith .......................... | 398/118 |
| 7,079,774 | B2 * | 7/2006 | Sidorovich et al. .......... | 398/129 |
| 7,155,129 | B2 * | 12/2006 | Bringans et al. ............. | 398/131 |
| 7,177,550 | B1 * | 2/2007 | Smith .......................... | 398/212 |
| 7,190,905 | B2 * | 3/2007 | Sakanaka ..................... | 398/129 |
| 7,268,343 | B2 * | 9/2007 | Goldberg et al. ........ | 250/227.14 |
| 7,289,736 | B1 * | 10/2007 | Graves ......................... | 398/119 |
| 7,420,669 | B2 * | 9/2008 | Sopori et al. ............. | 356/237.4 |
| 7,450,855 | B2 * | 11/2008 | Ohmuro ...................... | 398/123 |
| 7,460,221 | B2 * | 12/2008 | Goldberg et al. ......... | 356/237.4 |
| 7,489,871 | B2 * | 2/2009 | Takahashi et al. ........... | 398/129 |

(Continued)

FOREIGN PATENT DOCUMENTS

JP 05-133716 5/1993

*Primary Examiner*—Ken N Vanderpuye
*Assistant Examiner*—Danny W Leung
(74) *Attorney, Agent, or Firm*—Wenderoth, Lind & Ponack, L.L.P.

(57) ABSTRACT

The present invention provides an optical receiving device, in which a portion of an optical signal is deflected for optical axis detection only when the optical axis is misaligned to thereby achieve a high S/N ratio of a received signal. A condensing section 100 condenses a received optical signal. An optical element 110 includes a transmission region 111 and a deflecting region 112, and receives the optical signal, which has been condensed through the condensing section 100. A signal light receiving section 120 receives the transmitted light, which has been transmitted through the transmission region 111. A detection light receiving section 130 receives deflected light, which has been deflected through the deflecting region 112 and performs a photoelectric conversion on the received light to thereby output a detection intensity signal that indicates an intensity of the deflected light. An optical axis detection section 140 detects an optical axis misalignment based on the detection intensity signal outputted from the detection light receiving section 130 to output an optical axis detection signal. An optical axis adjustment section 150 performs an optical axis adjustment based on the optical axis detection signal.

15 Claims, 12 Drawing Sheets

U.S. PATENT DOCUMENTS

2005/0025492 A1* 2/2005 Marazzi et al. ............. 398/131
2007/0223929 A1* 9/2007 Graves ....................... 398/122
2007/0280694 A1* 12/2007 Yasumoto et al. ........... 398/119
2009/0103930 A1* 4/2009 Beausoleil et al. .......... 398/156
2009/0110406 A1* 4/2009 Morris et al. ............... 398/131

* cited by examiner

OPTICAL RECEIVING DEVICE AND OPTICAL RECEIVING METHOD

BACKGROUND OF THE INVENTION

1. Field of the Invention

The present invention relates to an optical receiving device for use in optical free space transmission, and more particularly to an optical receiving device and an optical receiving method in which a portion of an optical signal is deflected for optical axis detection only when the optical axis is misaligned to thereby achieve a high S/N ratio of a received signal.

2. Description of the Background Art

Wireless transmission, which requires no wiring, has become popular as a data communications method between portable information terminals such as mobile telephones and PDAs. Particularly, wireless LANs using radio waves in the 2.4/5.2 Hz band as carriers are widespread. However, despite the usefulness thereof, there are also disadvantages caused by the wave transpiration, such as interchannel interference, decreased levels of security, and limitations in the transmission speed (on the order of 10 Mbps).

Therefore, attention has been drawn to optical free space transmission using infrared rays having various advantages over radio waves. Advantages in using infrared rays as carriers include the high level of security because of the straightness/blocking property of light, and the possibility for high-speed transmission utilizing the wideband property of an optical carrier. Note however that due to the straightness of an optical carrier, the transmitter and the receiver need to face each other to some degree. Thus, with an optical receiving device, the flexibility in installation is higher as the range of optical reception is wider.

Conventional means for expanding the range of optical reception of an optical receiving device include the optical means where the range of optical reception is expanded by improving the optical system such as the use of a lens having a high numerical aperture, and the mechanical means where the optical axis of the optical signal outputted from the optical transmitting device is detected and the optical axis is adjusted by moving the optical receiving device itself, or a lens, a mirror, an optical receiving element, etc. With the latter mechanical means, the light receiving angle of the optical system is not as wide as that with the former optical means, but it is possible to receive only the optical signal in the vicinity of the optical axis by performing the optical axis adjustment, whereby the influence of unnecessary light can be reduced and the S/N of the received signal can be increased as compared with the former optical means.

A conventional optical receiving device using the mechanical means is described in Japanese Laid-Open Patent Publication No. 5-133716 (hereinafter referred to as "Patent Document 1"), for example. FIG. 11 is a block diagram showing a configuration of a conventional optical receiving device described in Patent Document 1. In FIG. 11, the conventional optical receiving device includes a total reflection mirror 900, a deflecting mirror 910, a signal light receiving element 920, an optical axis detection light receiving element 930, the condensing lenses 901 and 902, an optical axis detection circuit section 940, and an optical axis adjustment section 950.

The optical signal reaching the optical receiving device is reflected by the total reflection mirror 900 toward the deflecting mirror 910, and a portion of the optical signal is reflected by the deflecting mirror 910 toward the condensing lens 901, after which the portion is condensed through the condensing lens 901 and coupled to the optical axis detection light receiving element 930. The optical signal passing through the deflecting mirror 910 is condensed through the condensing lens 902 and coupled to the signal light receiving element 920.

FIG. 12 shows an exemplary general configuration of the optical axis detection light receiving element 930 used in the conventional optical receiving device. As shown in FIG. 12, the optical axis detection light receiving element 930 is a light receiving element whose light receiving surface is divided into a region 931, a region 932, a region 933 and a region 934, and is capable of outputting an electric signal according to the proportion among portions of a beam spot 935 coupled to the regions 931 to 934. The optical axis detection circuit section 940 detects an optical axis misalignment based on the electric signal outputted from the optical axis detection light receiving element 930 to thereby output an optical axis detection signal to the optical axis adjustment section 950. The optical axis adjustment section 950 adjusts the angle of the total reflection mirror 900 based on the optical axis detection signal.

However, with the conventional optical receiving device, a portion of the received optical signal is deflected by the deflecting mirror 910. Therefore, a portion of the optical signal is always deflected for the purpose of optical axis detection even where there is no optical axis misalignment, whereby the power of the optical signal coupled to the signal light receiving element 920 is reduced and the S/N of the received signal deteriorates.

SUMMARY OF THE INVENTION

Therefore, an object of the present invention, which solves the problems in the prior art, is to provide an optical receiving device and an optical receiving method, in which a portion of an optical signal is deflected for optical axis detection only when the optical axis is misaligned to thereby achieve a high S/N of a received signal.

The present invention is directed to an optical receiving device for receiving an optical signal transmitted via space as a medium. In order to attain the object set forth above, the optical receiving device of the present invention includes: a condensing section for condensing the received optical signal; an optical element including a transmission region and a deflecting region, and receiving the optical signal, which has been condensed through the condensing section; a signal light receiving section for receiving transmitted light, which has been transmitted through the transmission region, and performing a photoelectric conversion on the received light; a detection light receiving section for receiving deflected light, which has been deflected through the deflecting region, and performing a photoelectric conversion on the received light to thereby output a detection intensity signal that indicates an intensity of the deflected light; an optical axis detection section for detecting an optical axis misalignment based on the detection intensity signal outputted from the detection light receiving section to output an optical axis detection signal; and an optical axis adjustment section for performing an optical axis adjustment based on the optical axis detection signal. The optical element is located between the condensing section and the signal light receiving section so that a central axis of the signal light receiving section is generally aligned with that of the transmission region. The deflecting region receives leak light being a portion of the optical signal and being caused by an optical axis misalignment, and outputs deflected light to the detection light receiving section.

Thus, an portion of the optical signal is used for optical axis detection when there is an optical axis misalignment, whereas most of the optical signal condensed through the condensing section passes through the transmission region to be coupled to the signal light receiving section when there is no optical axis misalignment, whereby it is possible to efficiently receive the optical signal.

Preferably, a boundary between the transmission region and the deflecting region of the optical element has an annular shape, and a diameter of the boundary is greater than that of a cross section of a light beam of the condensed optical signal at a position of the optical element. Thus, no matter in which direction the optical axis shifts with respect to the normal direction of the rotation about the central axis of the transmission region, a portion of the condensed optical signal can enter the deflecting region.

In one embodiment, a boundary between the transmission region and the deflecting region of the optical element has an annular shape, and a diameter of the boundary is greater than that of a cross section of a light beam of the condensed optical signal at a position of the optical element, the shape of the boundary being generally similar to the cross section of the light beam of the condensed optical signal at the position of the optical element. Thus, no matter in which direction the optical axis shifts with respect to the normal direction of the rotation about the central axis of the transmission region, a portion of the evenly condensed optical signal can enter the deflecting region.

Preferably, the transmission region is a hole in the optical element having a diameter greater than that of a cross section of a light beam of the condensed optical signal. Thus, it is possible to reduce the loss occurring when the optical signal passes through the transmission region.

Preferably, the detection light receiving section is arranged to be concentric with the signal light receiving section. Thus, no matter in which direction the optical axis shifts with respect to the normal direction of the rotation about the central axis of the transmission region, the deflected light can be received.

In one embodiment, the detection light receiving section is arranged to be concentric with the signal light receiving section, and includes a plurality of regions for performing a photoelectric conversion. Thus, no matter in which direction the optical axis shifts with respect to the normal direction of the rotation about the central axis of the transmission region, the deflected light can be received, and receiving the deflected light in the plurality of regions for performing a photoelectric conversion allows for a more detailed detection of an optical axis misalignment.

The deflecting region has a negative focal distance and diverges input light toward the detection light receiving section. Thus, the deflected light can be outputted to a plurality of light-receiving regions of the detection light receiving section.

Preferably, the deflecting region is a Fresnel lens or a diffractive lens. Thus, the optical element can be made with a small thickness.

The detection light receiving section is produced on the same substrate as the signal light receiving section. Thus, the detection light receiving section and the signal light receiving section can be made integral with each other, and it is possible to reduce the number of components.

Preferably, the optical receiving device further includes a signal receiving circuit section for outputting a signal-receiving intensity signal that indicates a signal-receiving intensity of the transmitted light based on a signal obtained through a photoelectric conversion of the transmitted light by the signal light receiving section. Then, the optical axis adjustment section performs an optical axis adjustment based on the optical axis detection signal and the signal-receiving intensity signal. Thus, the optical axis adjustment section can perform an optical axis adjustment while determining the degree of optical axis misalignment.

Preferably, the optical axis adjustment section maintains an optical axis if a first condition that the signal-receiving intensity signal is greater than a first threshold value and the optical axis detection signal is less than a second threshold value is satisfied; if the first condition is not satisfied, the optical axis adjustment section determines whether a second condition that the signal-receiving intensity signal is greater than the first threshold value and the optical axis detection signal is greater than the second threshold value is satisfied, wherein if the second condition is satisfied, the optical axis adjustment section sets a step of optical axis adjustment to a small level and performs an optical axis adjustment; if the second condition is not satisfied, the optical axis adjustment section determines whether a third condition that the signal-receiving intensity signal is less than the first threshold value and the optical axis detection signal is greater than the second threshold value is satisfied, wherein if the third condition is satisfied, the optical axis adjustment section sets the step of optical axis adjustment to a medium level and performs an optical axis adjustment; if the third condition is not satisfied, the optical axis adjustment section sets the step of optical axis adjustment to a large level and searches for an optical axis in all directions in which the optical axis adjustment can be done, wherein it is determined whether a fourth condition that the signal-receiving intensity signal is greater than the first threshold value or the optical axis detection signal is greater than the second threshold value is satisfied, and the optical axis adjustment section determines again whether the first condition is satisfied if the fourth condition is satisfied; and if the fourth condition is not satisfied, the optical axis adjustment section discontinues the optical axis adjustment.

Thus, the optical axis adjustment section can perform a more efficient optical axis adjustment by changing the step of optical axis adjustment according to the magnitude of the signal-receiving intensity signal and that of the optical axis detection signal.

In one embodiment, if a first condition that the optical axis detection signal is greater than a predetermined threshold value is satisfied, the optical axis adjustment section adjusts an optical axis based on the optical axis detection signal; if the first condition is not satisfied, the optical axis adjustment section determines whether a second condition that the signal-receiving intensity signal is greater than a minimum received signal intensity for the signal light receiving section to establish communication without errors is satisfied, wherein the optical axis adjustment section maintains the optical axis if the second condition is satisfied; if the second condition is not satisfied, the optical axis adjustment section searches for an optical axis in all directions in which the optical axis adjustment can be done, wherein it is determined whether a third condition that the optical axis detection signal is greater than the predetermined threshold value is satisfied, and the optical axis adjustment section adjusts the optical axis based on the optical axis detection signal if the third condition is satisfied; and if the third condition is not satisfied, the optical axis adjustment section discontinues the optical axis adjustment.

Thus, the optical axis adjustment section can detect and adjust an optical axis misalignment with a simpler procedure.

The present invention is also directed to an optical receiving method performed by an optical receiving device for receiving an optical signal transmitted via space as a medium. In order to attain the object set forth above, the method of the present invention includes: a condensing step of condensing the received optical signal; a step of transmitting a portion of the condensed optical signal that is aligned with an optical axis as transmitted light while deflecting another portion thereof that is not aligned with the optical axis as deflected light; a signal light receiving step of receiving the transmitted light and performing a photoelectric conversion on the received light; a detection light receiving step of receiving the deflected light and performing a photoelectric conversion on the received light to thereby output a detection intensity signal that indicates an intensity of the deflected light; an optical axis detection step of detecting an optical axis misalignment based on the detection intensity signal to output an optical axis detection signal; and an optical axis adjustment step of performing an optical axis adjustment based on the optical axis detection signal.

Thus, an portion of the optical signal is used for optical axis detection when there is an optical axis misalignment, whereas most of the optical signal condensed through the condensing section passes through the transmission region to be coupled to the signal light receiving section when there is no optical axis misalignment, whereby it is possible to efficiently receive the optical signal.

The present invention is also directed to an optical axis misalignment detection method performed by an optical receiving device for receiving an optical signal transmitted via space as a medium. In order to attain the object set forth above, the optical axis misalignment detection method of the present invention includes: a condensing step of condensing the received optical signal; a step of transmitting a portion of the condensed optical signal that is aligned with an optical axis as transmitted light while deflecting leak light caused by an optical axis misalignment as deflected light; a signal light receiving step of receiving the transmitted light and performing a photoelectric conversion on the received light; a detection light receiving step of receiving the deflected light and performing a photoelectric conversion on the received light to thereby output a detection intensity signal that indicates an intensity of the deflected light; and an optical axis detection step of detecting an optical axis misalignment based on the detection intensity signal to output an optical axis detection signal.

Thus, an portion of the optical signal is used for optical axis detection when there is an optical axis misalignment, whereas most of the optical signal condensed through the condensing section passes through the transmission region to be coupled to the signal light receiving section when there is no optical axis misalignment, whereby it is possible to detect an optical axis misalignment while realizing a high S/N ratio of a received signal.

As described above, with the present invention, the boundary between the transmission region and the deflecting region of the optical element is annular and the diameter of the boundary is greater than the light beam diameter of the condensed optical signal at the position of the optical element. Therefore, when there is no optical axis misalignment, all of the condensed optical signal can pass through the transmission region and be coupled to the signal light receiving section, and where there is an optical axis misalignment, only a portion of the condensed optical signal enters the deflecting region, whereby an optical axis detection can be performed by the detection light receiving section. Thus, it is possible to realize an optical axis adjustment while reducing the loss of the optical signal.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will now be described with reference to the drawings.

First Embodiment

Figure 1:
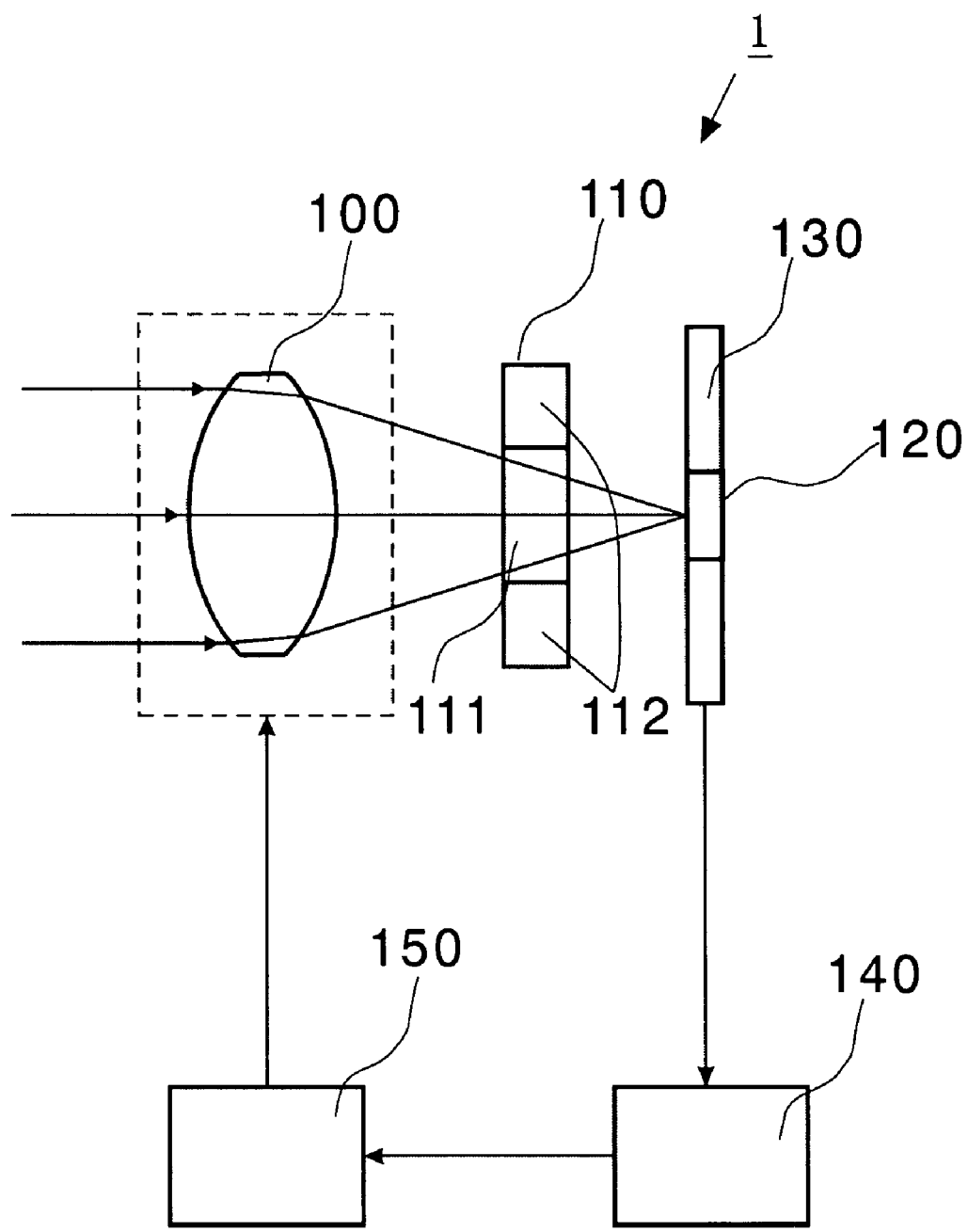
FIG. 1 is a block diagram showing an exemplary general configuration of an optical receiving device 1 according to a first embodiment of the present invention (with no optical axis misalignment)
Figure 2:
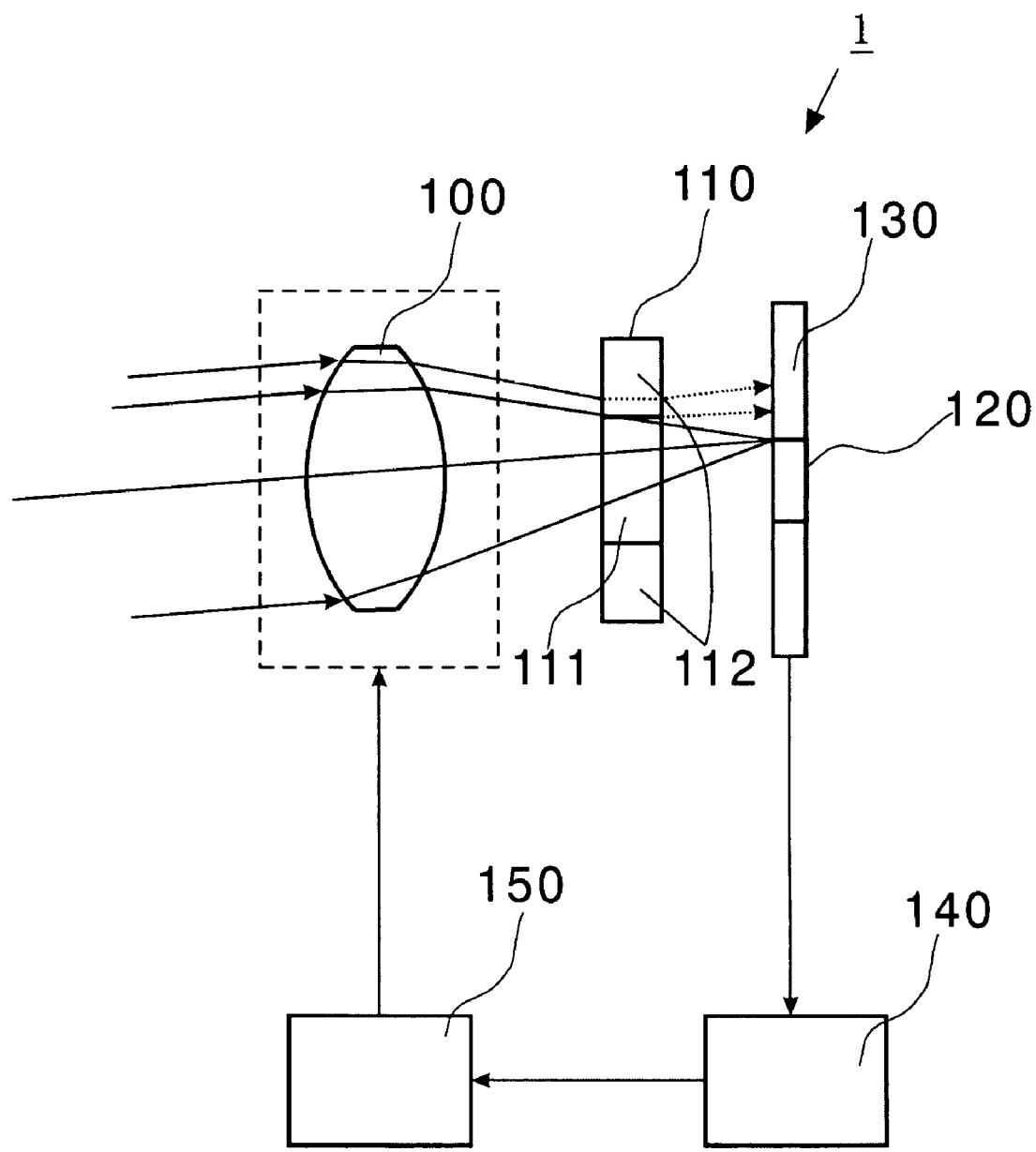
FIG. 2 is a block diagram showing an exemplary general configuration of the optical receiving device 1 according to the first embodiment of the present invention (with an optical axis misalignment)
Figure 3:
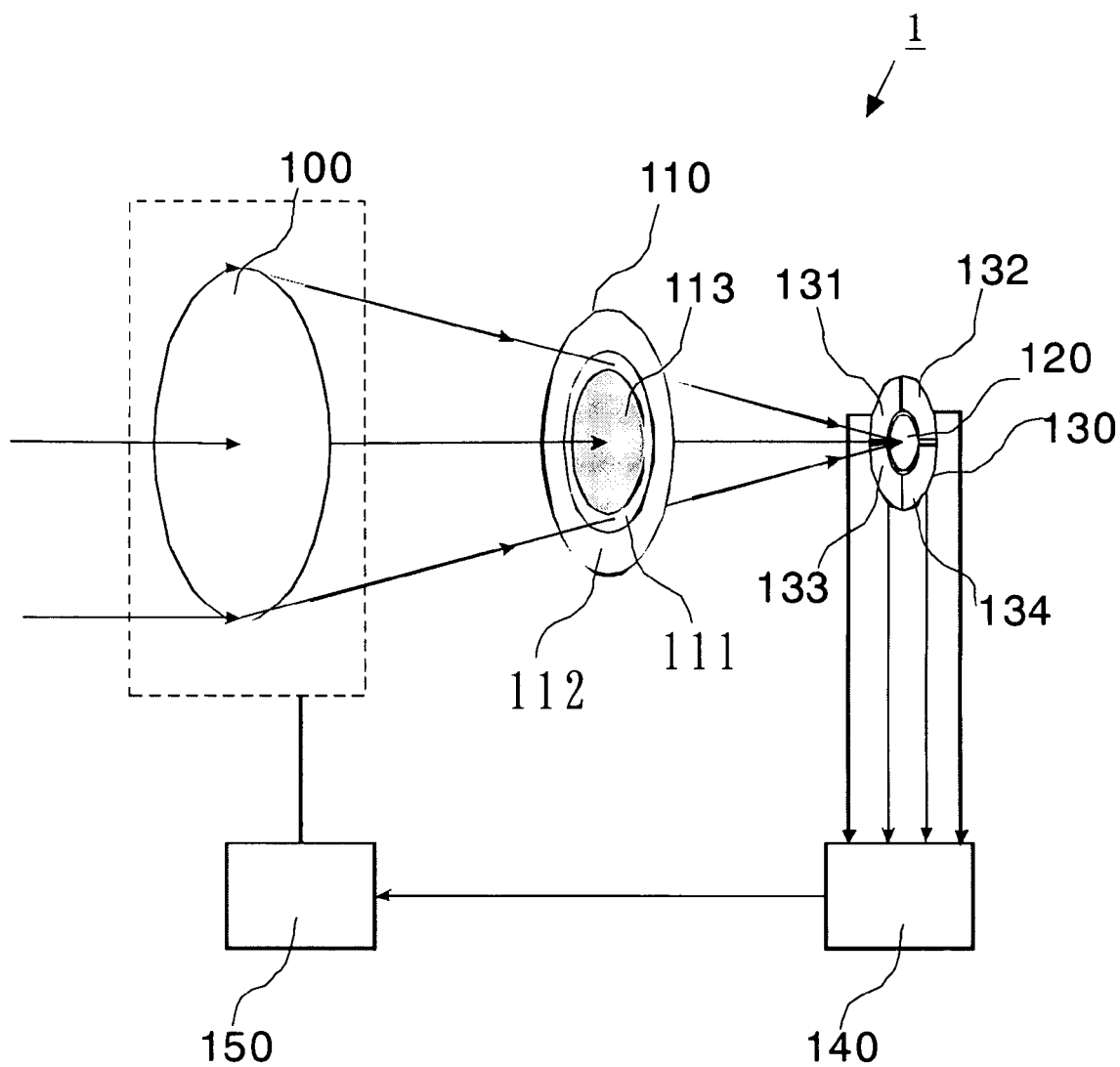
FIG. 3 is a perspective view showing a general configuration of the optical receiving device 1 according to the first embodiment of the present invention (with no optical axis misalignment)

FIGS. 1 and 2 are block diagrams showing an exemplary general configuration of the optical receiving device 1 according to a first embodiment of the present invention. FIG. 3 is a perspective view showing a general configuration of the optical receiving device 1 according to the first embodiment of the present invention. Note that FIGS. 1 and 3 show the optical receiving device 1 with no optical axis misalignment, and FIG. 2 shows the optical receiving device 1 with an optical axis misalignment.

In FIGS. 1 to 3, the optical receiving device 1 includes a condensing section 100, an optical element 110, a signal light receiving section 120, a detection light receiving section 130, an optical axis detection section 140, and an optical axis adjustment section 150.

The condensing section 100 is a convex lens receiving an optical signal and outputting a condensed optical signal to the optical element 110. The optical element 110 includes a transmission region 111 and a deflecting region 112, and is located between the condensing section 100 and the signal light receiving section 120 so that the central axis of the signal light receiving section 120 is aligned with that of the transmission region 111. The boundary between the transmission region 111 and the deflecting region 112 has an annular shape, and the diameter of the boundary is greater than that of the light beam of the condensed optical signal at the position where the optical element 110 is located. It is preferred that the shape of the boundary is generally similar to the cross section of the light beam of the condensed optical signal at the position where the optical element 110 is located.

Figure 4:
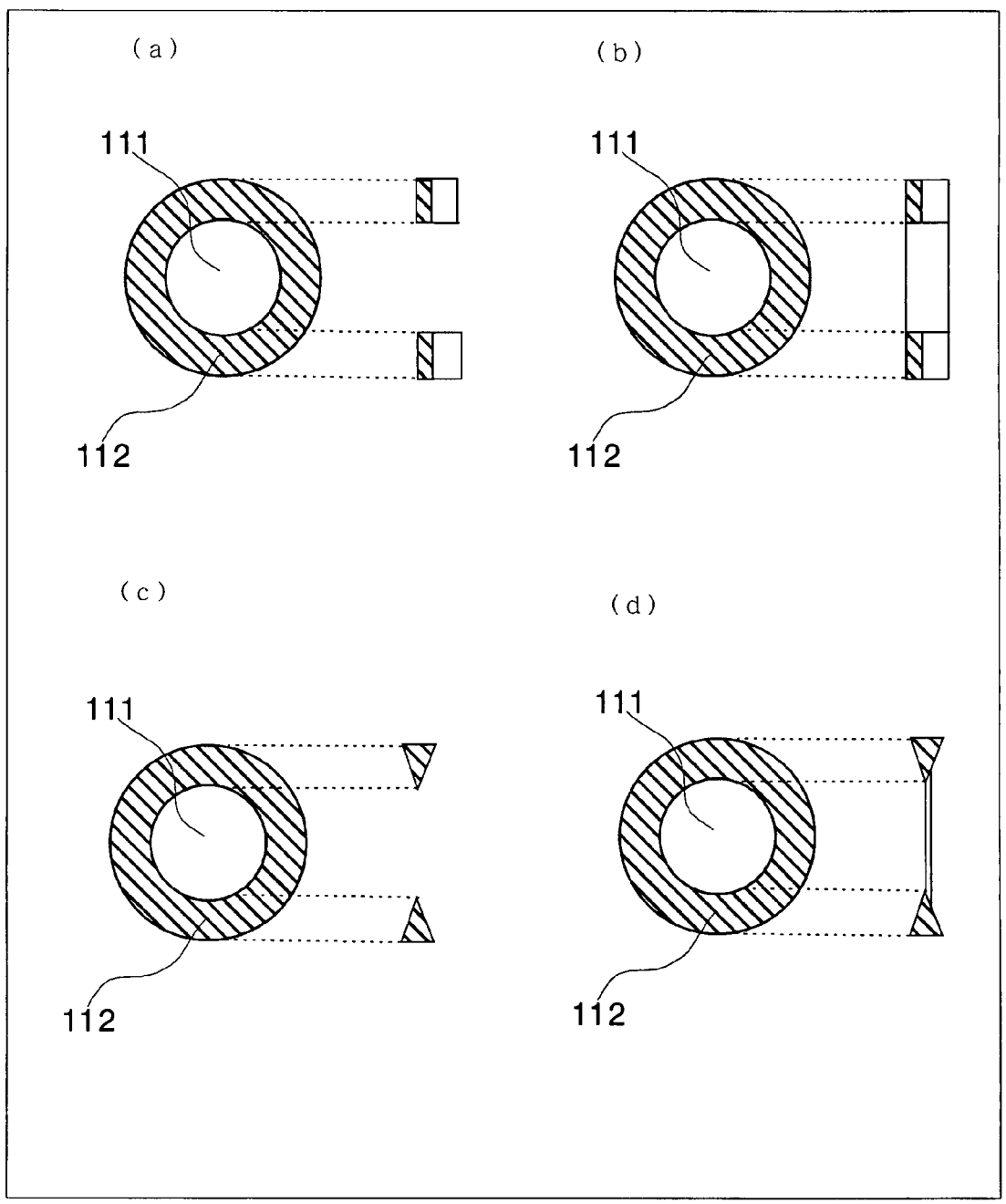
FIG. 4 is a schematic diagram generally showing an optical element 110 according to the first embodiment of the present invention.

FIG. 4 is a schematic diagram showing an exemplary general configuration of the optical element 110. In FIG. 4, a hatched portion represents the deflecting region 112. The transmission region 111 is a hole in the optical element 110 having a diameter greater than that of the light beam of the condensed optical signal, and outputs the condensed optical signal as transmitted light.

The deflecting region 112 shown in FIG. 4(*a*) is a Fresnel lens, and has a negative focal distance (i.e., the lens has its focal point on the side opposite to the light beam receiving direction) for diverging the light beam of the received optical signal. Thus, when the deflecting region 112 receives a condensed optical signal, the light beam of the received optical signal is diverged and outputted as deflected light. It is preferred that the deflecting region 112 is made of a material that has a high refractive index and a low absorption loss for the wavelength of the optical signal.

The shape of the deflecting region 112 is not limited to a Fresnel lens as shown in FIG. 4(*a*), but may be a diffractive lens or a prism shape as shown in FIG. 4(*c*). The transmission region 111 may be made of the same material as that of the optical element 110 as shown in FIG. 4(*b*) or 4(*d*).

The signal light receiving section 120 receives transmitted light and performs a photoelectric conversion to output an electric signal. The detection light receiving section 130 receives deflected light and performs a photoelectric conversion to output a detection intensity signal that indicates the intensity of the deflected light. The optical axis detection section 140 detects an optical axis misalignment based on the detection intensity signal outputted from the detection light receiving section 130 to output an optical axis detection signal. The optical axis adjustment section 150 performs an optical axis adjustment based on the optical axis detection signal outputted from the optical axis detection section 140. The illustrated optical receiving device of the present embodiment performs the optical axis adjustment by moving the condensing section 100.

Where there is no optical axis misalignment as shown in FIGS. 1 and 3, the optical signal is condensed through the condensing section 100 and then passes through the transmission region 111 to be coupled to the signal light receiving section 120. Since the boundary between the transmission region 111 and the deflecting region 112 is annular, and the diameter of the boundary is greater than that of a cross section 113 of the light beam of the condensed optical signal at the position where the optical element 110 is located, most of the condensed optical signal passes through the transmission region 111 and substantially none of the condensed optical signal enters the deflecting region 112. Therefore, as compared with the conventional optical receiving device, which always deflects a portion of the received optical signal, the loss of the optical signal can be reduced significantly.

Where there is an optical axis misalignment as shown in FIG. 2, the optical signal is condensed through the condensing section 100, and then a portion thereof passes through the transmission region 111 to be coupled to the signal light receiving section 120 while the remaining portion, being leak light, enters the deflecting region 112. Leak light as used herein refers to a portion of the condensed optical signal that would not be coupled to the signal light receiving section 120 in the absence of the optical element 110. The leak light that has entered the deflecting region 112 is outputted toward the detection light receiving section 130 so that the light beam is diverged as indicated by a broken line in FIG. 2.

Figure 5:
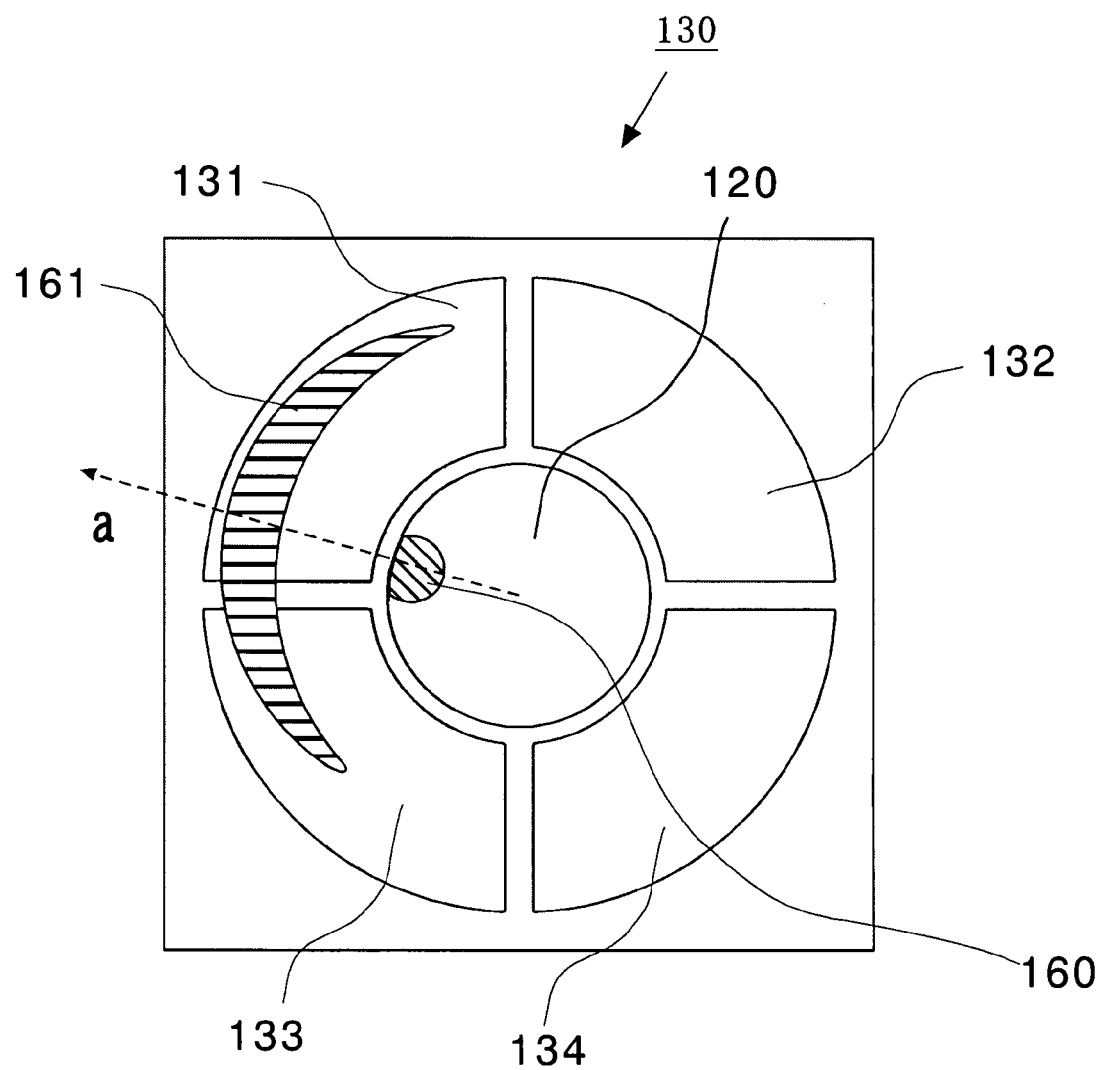
FIG. 5 is a schematic diagram generally showing a detection light receiving section 130 according to the first embodiment of the present invention.

Referring now to FIG. 5, a method by which the optical receiving device 1 detects an optical axis misalignment will be described in detail. FIG. 5 is a schematic diagram showing a general configuration of the detection light receiving section 130. In FIG. 5, the detection light receiving section 130 is produced on the same substrate as the signal light receiving section 120, and includes photoelectric conversion regions 131 to 134, which are divided so as to have substantially the same area and arranged together so as to be concentric with the signal light receiving section 120. The detection light receiving section 130 outputs a detection intensity signal according to the proportion between the amounts of deflected light received by the photoelectric conversion regions 131 to 134.

Hatched portions in FIG. 5 are an image 160 of the transmitted light and an image 161 of the deflected light at the detection light receiving section 130. If the optical axis is misaligned, the image 161 of the deflected light is received by the plurality of photoelectric conversion regions 131 to 134 of the detection light receiving section 130. For example, if the magnitude of the detection intensity signal outputted from the photoelectric conversion region 131 and that from the photoelectric conversion region 133 are equal to each other, it is detected that the optical axis is shifted in the X-axis direction. If the magnitude of the detection intensity signal outputted from the photoelectric conversion region 131 and that from the photoelectric conversion region 133 are different from each other, it is detected that the optical axis is shifted in the direction of the arrow a, for example, based on the proportion between the magnitude of the detection intensity signal outputted from the photoelectric conversion region 131 and that from the photoelectric conversion region 133.

Thus, if the optical signal is diverged through the deflecting region 112, the optical signal can be received by the plurality of photoelectric conversion regions 131 to 134 at the detection light receiving section 130, thereby allowing for a more detailed optical axis misalignment direction than when the light beam is not diverged.

As described above, with the optical receiving device 1 according to the first embodiment of the present invention, the boundary between the transmission region 111 and the deflecting region 112 of the optical element 110 is annular and the diameter of the boundary is greater than the light beam diameter of the condensed optical signal at the position of the optical element 110. Therefore, where there is no optical axis misalignment, all of the condensed optical signal can pass through the transmission region 111 and be coupled to the signal light receiving section 120, and where there is an optical axis misalignment, only a portion of the condensed optical signal enters the deflecting region 112, whereby an optical axis detection can be performed by the detection light receiving section 130. Thus, it is possible to realize an optical axis adjustment while reducing the loss of the optical signal.

The condensing section 100 is not limited to any particular type as long as it functions to condense the received light, and may be a convex lens, a diffractive lens, or a concave mirror. If the lens has a higher numerical aperture, a reduction in the size of the optical system can be expected.

Although the detection light receiving section 130 includes four divided photoelectric conversion regions, the number of divided portions is not limited to this. With more finely divided photoelectric conversion regions, it is possible to more accurately detect the optical axis misalignment direction.

The detection light receiving section 130 may include a plurality of light receiving elements arranged to be concentric around the signal light receiving section 120.

The optical axis adjustment section 150 is not limited to a configuration that moves the condensing section 100, but may be any other suitable means having a similar function, e.g., a function of changing the optical axis itself of the optical receiving device 1 by means of a reflection mirror, or the like.

Second Embodiment

Figure 6:
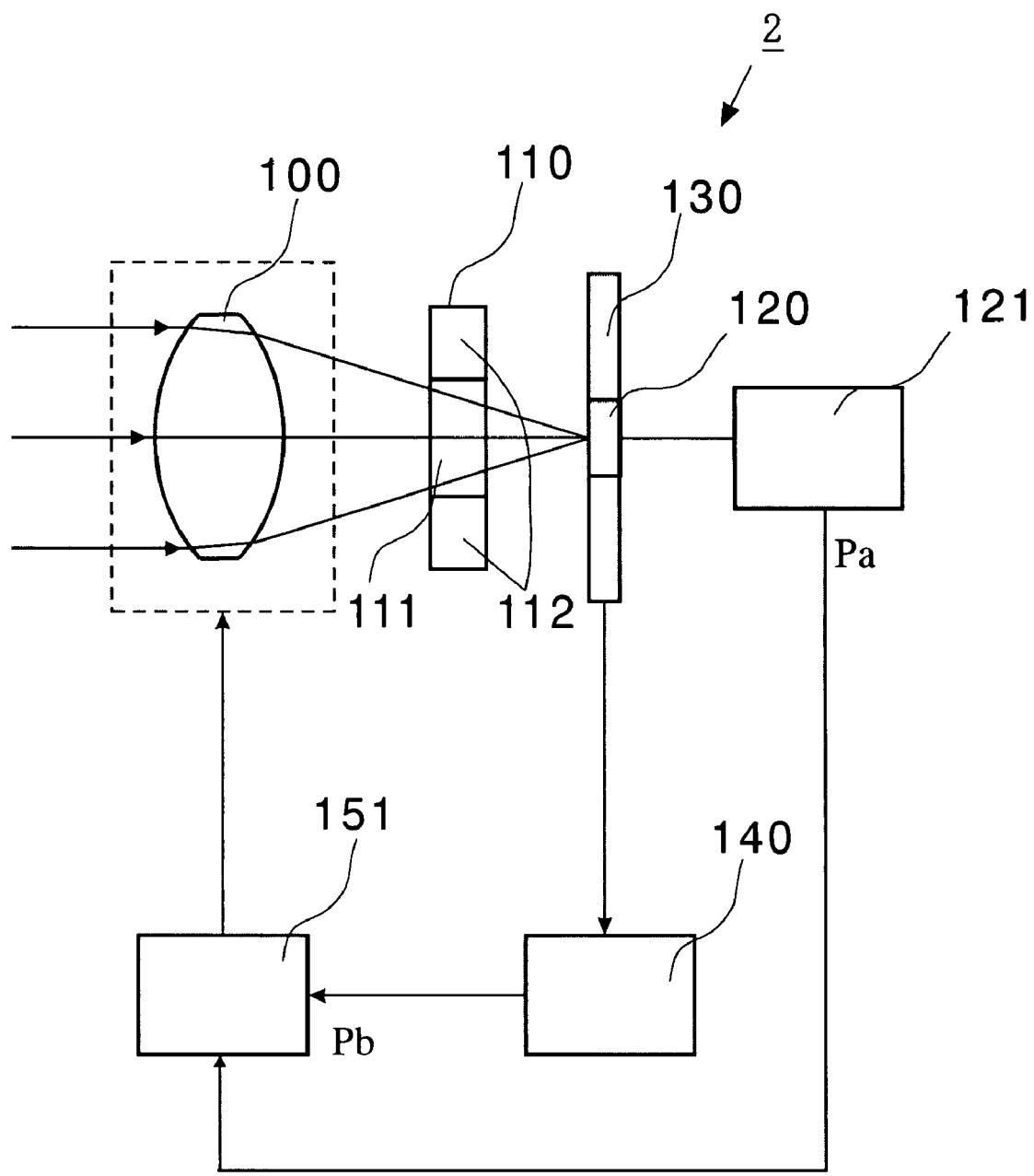
FIG. 6 is a block diagram showing an exemplary general configuration of an optical receiving device 2 according to a second embodiment of the present invention (with no optical axis misalignment)
Figure 7:
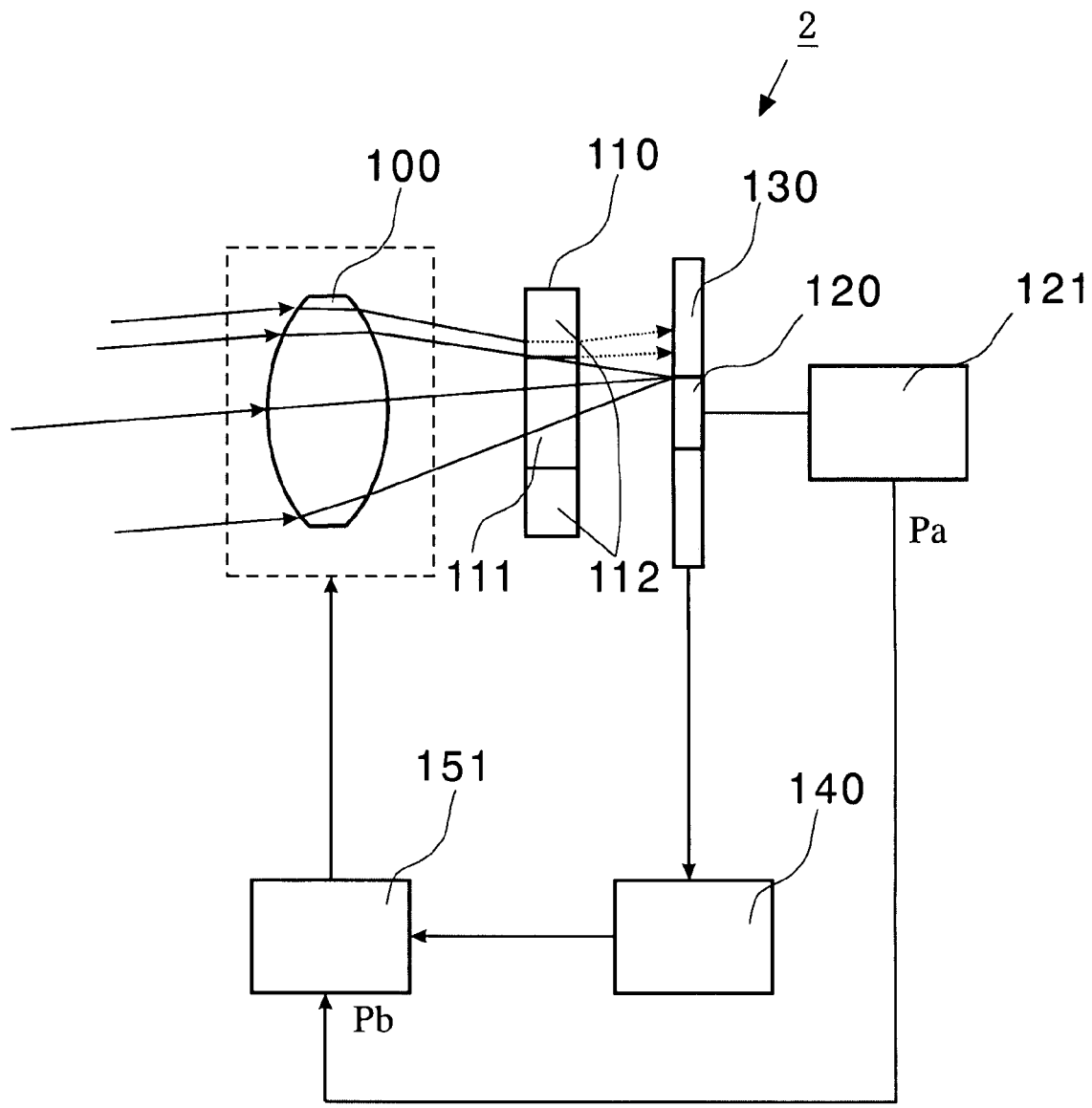
FIG. 7 is a block diagram showing an exemplary general configuration of the optical receiving device 2 according to the second embodiment of the present invention (with an optical axis misalignment)

FIGS. 6 and 7 are block diagrams showing an exemplary general configuration of the optical receiving device 2 according to a second embodiment of the present invention. Note that FIG. 6 shows the optical receiving device 2 with no optical axis misalignment, and FIG. 7 shows the optical receiving device 2 with an optical axis misalignment. Like elements to those of the optical receiving device 1 according to the first embodiment of the present invention are denoted by like reference numerals and will not be further described below.

In FIGS. 6 and 7, the optical receiving device 2 further includes a signal receiving circuit section 121. The signal receiving circuit section 121 outputs a signal-receiving intensity signal Pa based on the electric signal obtained through a photoelectric conversion by the signal light receiving section 120. The optical axis adjustment section 151 performs an optical axis adjustment based on the signal-receiving intensity signal Pa outputted from the signal receiving circuit section 121 and an optical axis detection signal Pb outputted from the optical axis detection section 140.

Figure 8:
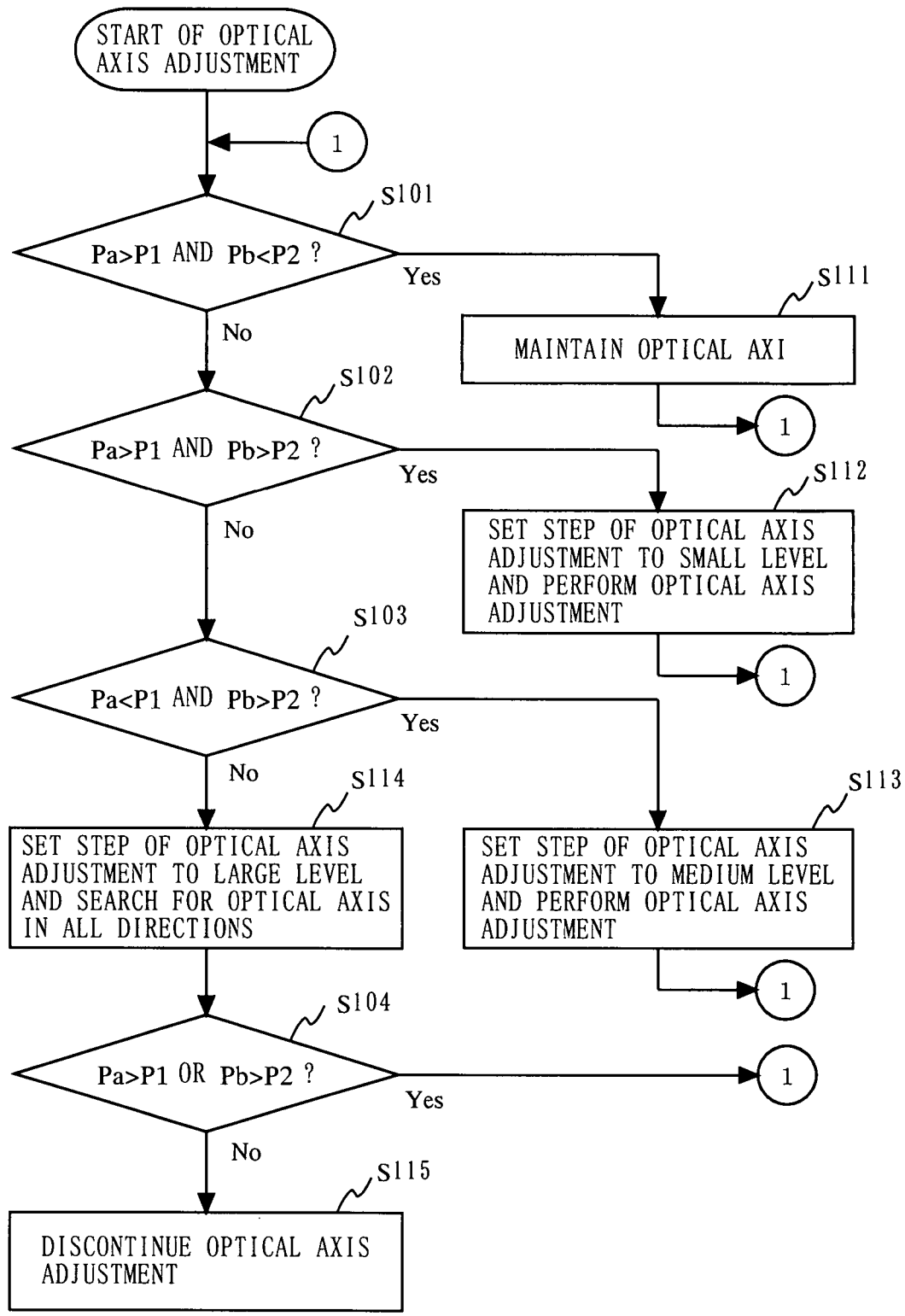
FIG. 8 is a flow chart showing an exemplary operation of an optical axis adjustment section 151 according to the second embodiment of the present invention.

Referring now to FIG. 8, the operation of the optical axis adjustment section 151 will be described in detail. FIG. 8 is a flow chart showing an example of the operation of the optical axis adjustment section 151. Referring to FIG. 8, the optical axis adjustment section 151 determines whether the condition that the signal-receiving intensity signal Pa is greater than a predetermined threshold value P1 and the optical axis detection signal Pb is less than a predetermined threshold value P2 (i.e., Pa>P1 and Pb<P2) is satisfied in order to determine the presence/absence of an optical axis misalignment (step S101). If the condition is satisfied, most of the optical signal is being coupled to the signal light receiving section 120. Therefore, the optical axis adjustment section 151 maintains the optical axis, and the condition of step S101 is determined again after the passage of a predetermined period of time (step S111).

If the condition of step S101 is not satisfied, the optical axis adjustment section 151 determines whether the condition that the signal-receiving intensity signal Pa is greater than the predetermined threshold value P1 and the optical axis detection signal Pb is greater than the predetermined threshold value P2 (i.e., Pa>P1 and Pb>P2) is satisfied in order to determine the degree of the optical axis misalignment (step S102). If the condition is satisfied, some of the optical signal is coupled to the signal light receiving section 120 and a portion of the optical signal is coupled to the detection light receiving section 130. Therefore, the optical axis adjustment section 151 sets the step of optical axis adjustment to a small level and performs an optical axis adjustment, and the condition of step S101 is determined again after the passage of a predetermined period of time (step S112).

If the condition of step S102 is not satisfied, the optical axis adjustment section 151 determines whether the signal-receiving intensity signal Pa is less than the predetermined threshold value P1 and the optical axis detection signal Pb is greater than the predetermined threshold value P2 (i.e., Pa<P1 and Pb>P2) is satisfied in order to further determine the degree of the optical axis misalignment (step S103). If the condition is satisfied, the optical signal is not coupled to the signal light receiving section 120 and most of the optical signal is coupled to the detection light receiving section 130. Therefore, the optical axis adjustment section 151 sets the step of optical axis adjustment to a medium level and performs an optical axis adjustment, and the condition of step S101 is determined again after the passage of a predetermined period of time (step S113).

If the condition of step S103 is not satisfied, the optical axis may be misaligned to such a degree that the signal cannot be coupled to the detection light receiving section 130. Therefore, the optical axis adjustment section 151 sets the step of optical axis adjustment to a large level and searches for the optical axis in all directions in which the optical axis adjustment can be done (step S114), wherein it is determined whether the condition that the signal-receiving intensity signal Pa is greater than the predetermined threshold value P1 or the optical axis detection signal Pb is greater than the predetermined threshold value P2 (i.e., Pa>P1 or Pb>P2) (step S104). If the condition is satisfied, the optical axis adjustment section 151 performs the determination process of step S101 again.

If the condition of step S104 is not satisfied, it is possible that the optical signal has not reached the optical receiving device 2. Therefore, the optical axis adjustment section 151 discontinues the optical axis adjustment (step S115). In this case, the user is notified that communication cannot be established, e.g., an error message is displayed.

As described above, with the optical receiving device 2 according to the second embodiment of the present invention, the step of optical axis adjustment is changed according to the magnitude of the signal-receiving intensity signal Pa and that of the optical axis detection signal Pb, thereby realizing a more efficient optical axis adjustment, in addition to the effects of the optical receiving device 1 of the first embodiment.

In order to realize a state where communication can be established when the optical axis is aligned, it is preferred that the threshold value P1 is generally equal to Pmin or greater than Pmin by 1 to 2 dB, where Pmin is the minimum received signal intensity that indicates the minimum intensity of the received signal for the signal light receiving section 120 to establish communication without errors.

Since a portion of the optical signal traveling outside the signal light receiving section 120 due to an optical axis misalignment is coupled to the detection light receiving section 130, it is possible to detect a smaller optical axis misalignment by using a smaller value for the threshold value P2.

Third Embodiment

Figure 9:
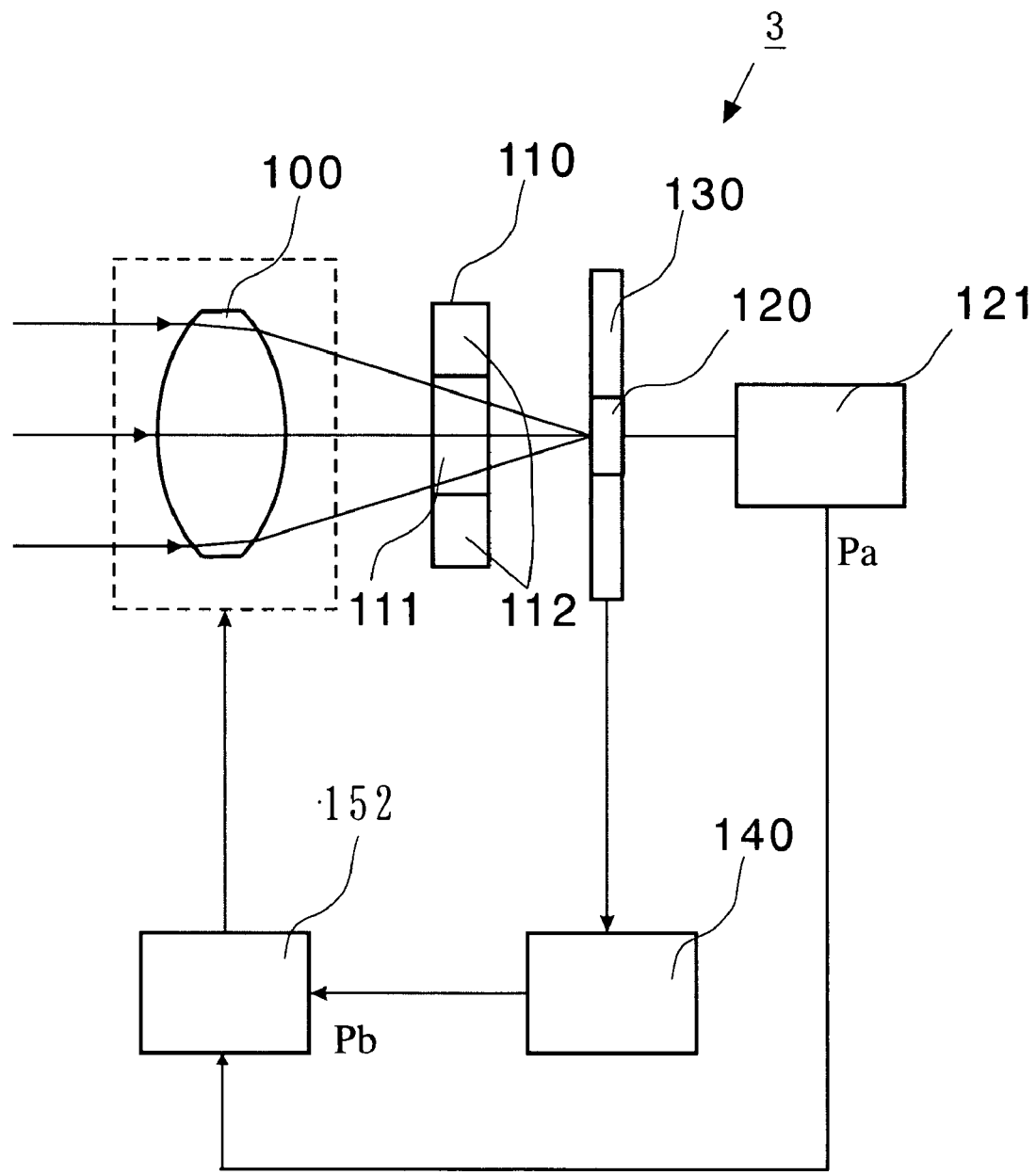
FIG. 9 is a block diagram showing an exemplary general configuration of an optical receiving device 3 according to a third embodiment of the present invention.

An optical receiving device 3 according to a third embodiment of the present invention will now be described with reference to the accompanying drawings. FIG. 9 is a block diagram showing an exemplary general configuration of the optical receiving device 3 according to the third embodiment of the present invention. Note that FIG. 9 shows the optical receiving device 3 with no optical axis misalignment. In FIG. 9, the optical receiving device 3 differs from the second embodiment only with respect to the. operation of an optical axis adjustment section 152. Like elements to those of the optical receiving device 2 according to the second embodiment of the present invention are denoted by like reference numerals and will not be further described below.

Figure 10:
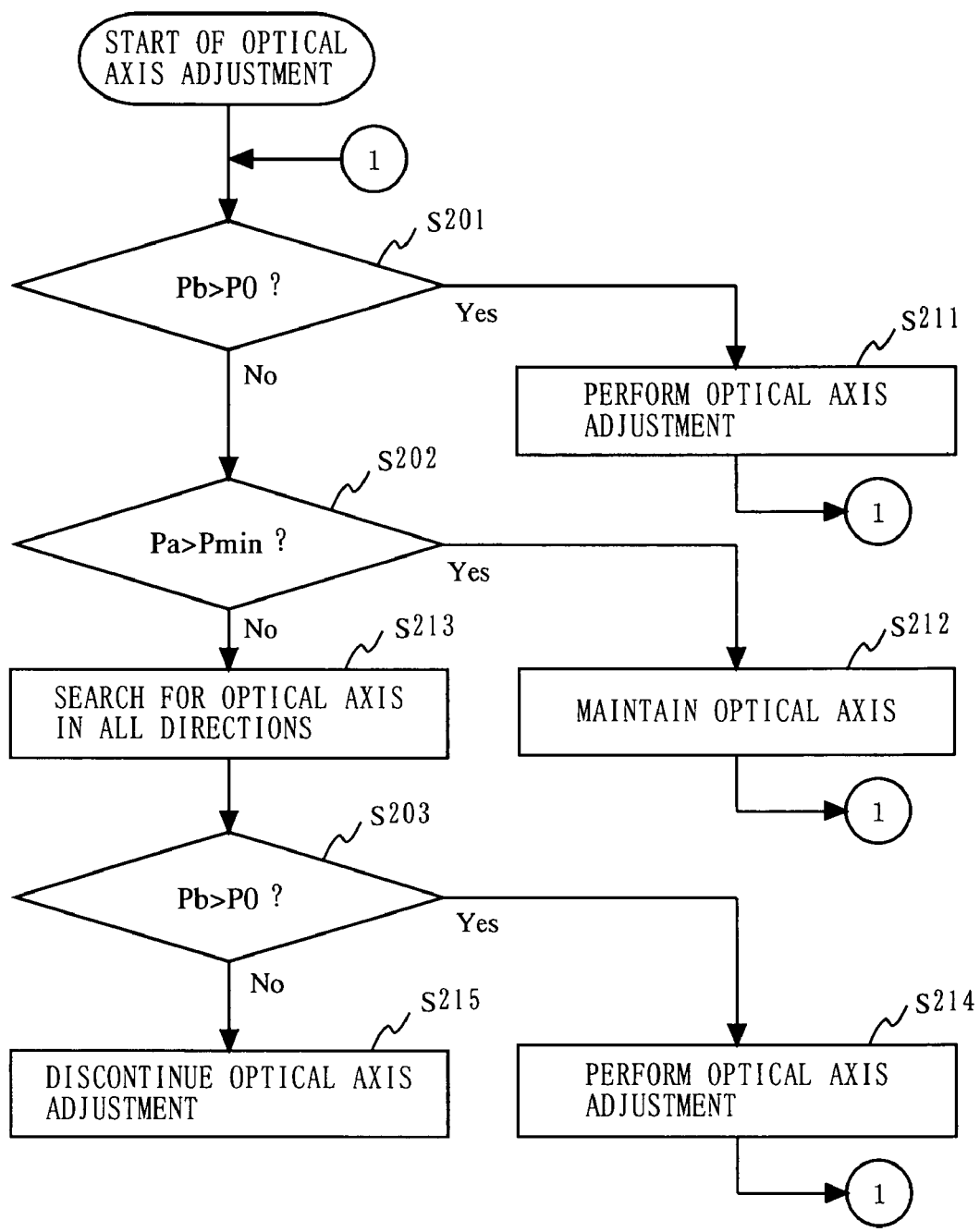
FIG. 10 is a flow chart showing an exemplary operation of an optical axis adjustment section 152 according to the third embodiment of the present invention.
Figure 11:
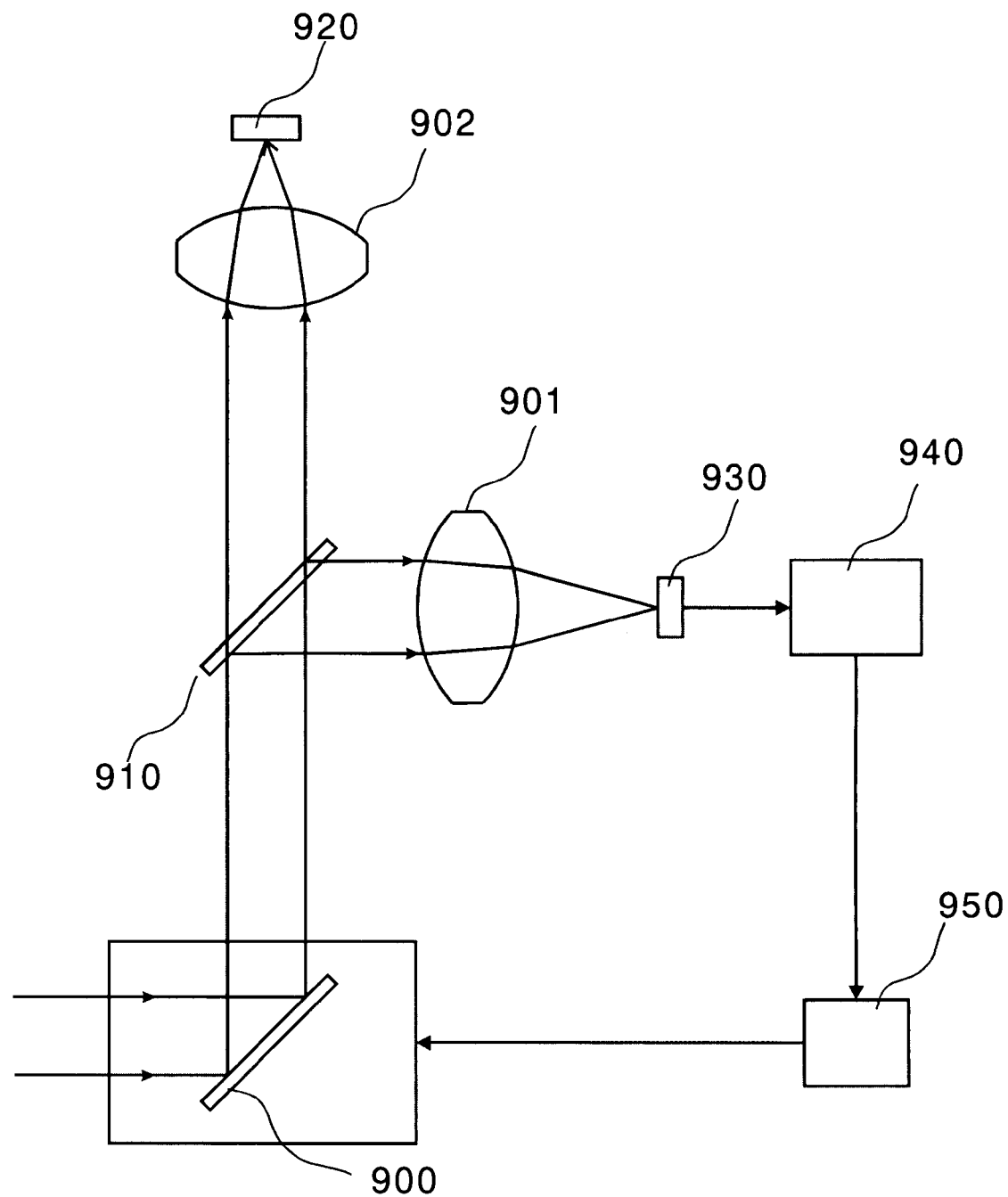
FIG. 11 is a block diagram showing a configuration of a conventional optical receiving device.
Figure 12:
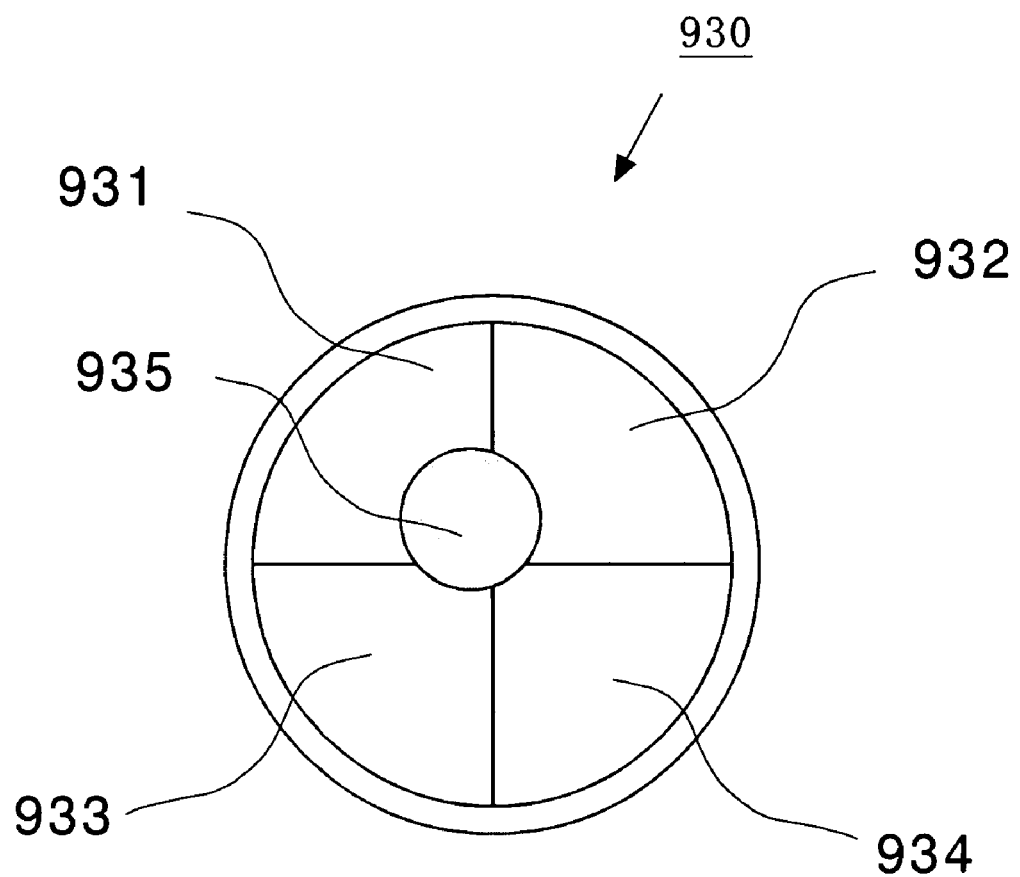
FIG. 12 shows an exemplary general configuration of an optical axis detection light receiving element 930 used in the conventional optical receiving device.

Referring now to FIG. 10, the operation of the optical axis adjustment section 152 will be described in detail. FIG. 10 is a flow chart showing an example of the operation of the optical axis adjustment section 152. Referring to FIG. 10, the optical axis adjustment section 152 determines whether the condition that the optical axis detection signal Pb is greater than a predetermined threshold value P0 (i.e., Pb>P0) is satisfied in order to determine the presence/absence of an optical axis misalignment (step S201). If the condition is satisfied, the optical axis is misaligned to such a degree that the optical signal can be detected by the detection light receiving section 130. Therefore, the optical axis adjustment section 152 adjusts the optical axis based on the optical axis detection signal Pb outputted from the optical axis detection section 140, and the condition of step S201 is determined again after the passage of a predetermined period of time (step S211).

If the condition of step S201 is not satisfied, there are a case where the optical axis is aligned and a case where the optical axis is misaligned to such a degree that the optical signal can be detected by the detection light receiving section 130. In order to distinguish these two cases from each other, the optical axis adjustment section 152 determines if the condition that the signal-receiving intensity signal Pa is greater than minimum received signal intensity Pmin (i.e., Pa>Pmin) is satisfied (step S202). If the condition is satisfied, the optical axis is aligned and there is obtained a sufficient received signal intensity for establishing communication without errors. Therefore, the optical axis adjustment section 152 maintains the optical axis, and the condition of step S201 is determined again after the passage of a predetermined period of time (step S212).

If the condition of step S202 is not satisfied, the optical axis adjustment section 152 searches for the optical axis in all directions in which the optical axis adjustment can be done (step S213), wherein it is determined whether the condition that the optical axis detection signal Pb is greater than the predetermined threshold value P0 (i.e., Pb>P0) is satisfied (step S203). If the condition is satisfied, the optical axis is misaligned to such a degree that the optical signal can be detected by the detection light receiving section 130. Therefore, the optical axis adjustment section 152 adjusts the optical axis based on the optical axis detection signal Pb outputted from the optical axis detection section 140, and the condition of step S201 is determined again after the passage of a predetermined period of time (step S214).

If the condition of step S203 is not satisfied, it is possible that the optical signal has not reached the optical receiving device 3. Therefore, the optical axis adjustment section 152 discontinues the optical axis adjustment (step S215). In this case, the user is notified that communication cannot be established, e.g., an error message is displayed.

It is possible to detect a smaller optical axis misalignment by using a smaller value for the threshold value P0.

As described above, with the optical receiving device 3 according to the third embodiment of the present invention, it is possible to detect and adjust an optical axis misalignment with a simpler procedure than that with the optical receiving device 2 of the second embodiment.

The optical receiving device of the present invention is useful as a configuration for improving the received optical power of an optical free space transmission device, or the like. The present invention can also be used in applications such as an optical receiving device of an optical sensor.

While the invention has been described in detail, the foregoing description is in all aspects illustrative and not restrictive. It is understood that numerous other modifications and variations can be devised without departing from the scope of the invention.

What is claimed is:

1. An optical receiving device for receiving an optical signal transmitted via space as a medium, the optical receiving device comprising:
   a condensing section for condensing the received optical signal;
   an optical element including a transmission region and a deflecting region, and receiving the optical signal, which has been condensed through the condensing section;
   a signal light receiving section for receiving transmitted light, which has been transmitted through the transmission region, and performing a photoelectric conversion on the received light;
   a detection light receiving section for receiving deflected light, which has been deflected through the deflecting region, and performing a photoelectric conversion on the received light to thereby output a detection intensity signal that indicates an intensity of the deflected light;
   an optical axis detection section for detecting an optical axis misalignment based on the detection intensity signal outputted from the detection light receiving section to output an optical axis detection signal; and
   an optical axis adjustment section for performing an optical axis adjustment based on the optical axis detection signal, wherein:
   the optical element is located between the condensing section and the signal light receiving section so that a central axis of the signal light receiving section is generally aligned with that of the transmission region; and
   the deflecting region receives leak light being a portion of the optical signal and being caused by an optical axis misalignment, and outputs deflected light to the detection light receiving section.

2. The optical receiving device according to claim 1, wherein a boundary between the transmission region and the deflecting region of the optical element has an annular shape, and a diameter of the boundary is greater than that of a cross section of a light beam of the condensed optical signal at a position of the optical element.

3. The optical receiving device according to claim 1, wherein a boundary between the transmission region and the deflecting region of the optical element has an annular shape, and a diameter of the boundary is greater than that of a cross section of a light beam of the condensed optical signal at a position of the optical element, the shape of the boundary being generally similar to the cross section of the light beam of the condensed optical signal at the position of the optical element.

4. The optical receiving device according to claim 1, wherein the transmission region is a hole in the optical element having a diameter greater than that of a cross section of a light beam of the condensed optical signal.

5. The optical receiving device according to claim 1, wherein the detection light receiving section is arranged to be concentric with the signal light receiving section.

6. The optical receiving device according to claim 1, wherein the detection light receiving section is arranged to be concentric with the signal light receiving section, and includes a plurality of regions for performing a photoelectric conversion.

7. The optical receiving device according to claim 1, wherein the deflecting region has a negative focal distance and diverges input light toward the detection light receiving section.

8. The optical receiving device according to claim 7, wherein the deflecting region is a Fresnel lens.

9. The optical receiving device according to claim 7, wherein the deflecting region is a diffractive lens.

10. The optical receiving device according to claim 1, wherein the detection light receiving section is produced on the same substrate as the signal light receiving section.

11. The optical receiving device according to claim 1, further comprising a signal receiving circuit section for outputting a signal-receiving intensity signal that indicates a signal-receiving intensity of the transmitted light based on a signal obtained through a photoelectric conversion of the transmitted light by the signal light receiving section, wherein the optical axis adjustment section performs an optical axis adjustment based on the optical axis detection signal and the signal-receiving intensity signal.

12. The optical receiving device according to claim 11, wherein:
    the optical axis adjustment section maintains an optical axis if a first condition that the signal-receiving intensity signal is greater than a first threshold value and the optical axis detection signal is less than a second threshold value is satisfied;
    if the first condition is not satisfied, the optical axis adjustment section determines whether a second condition that the signal-receiving intensity signal is greater than the first threshold value and the optical axis detection signal is greater than the second threshold value is satisfied, wherein if the second condition is satisfied, the optical axis adjustment section sets a step of optical axis adjustment to a small level and performs an optical axis adjustment;
    if the second condition is not satisfied, the optical axis adjustment section determines whether a third condition that the signal-receiving intensity signal is less than the first threshold value and the optical axis detection signal is greater than the second threshold value is satisfied, wherein if the third condition is satisfied, the optical axis adjustment section sets the step of optical axis adjustment to a medium level and performs an optical axis adjustment;
    if the third condition is not satisfied, the optical axis adjustment section sets the step of optical axis adjustment to a large level and searches for an optical axis in all directions in which the optical axis adjustment can be done, wherein it is determined whether a fourth condition that the signal-receiving intensity signal is greater than the first threshold value or the optical axis detection signal is greater than the second threshold value is satisfied, and the optical axis adjustment section determines again whether the first condition is satisfied if the fourth condition is satisfied; and
    if the fourth condition is not satisfied, the optical axis adjustment section discontinues the optical axis adjustment.

13. The optical receiving device according to claim 11, wherein:
    if a first condition that the optical axis detection signal is greater than a predetermined threshold value is satisfied, the optical axis adjustment section adjusts an optical axis based on the optical axis detection signal;
    if the first condition is not satisfied, the optical axis adjustment section determines whether a second condition that the signal-receiving intensity signal is greater than a minimum received signal intensity for the signal light receiving section to establish communication without errors is satisfied, wherein the optical axis adjustment section maintains the optical axis if the second condition is satisfied;
    if the second condition is not satisfied, the optical axis adjustment section searches for an optical axis in all directions in which the optical axis adjustment can be done, wherein it is determined whether a third condition that the optical axis detection signal is greater than the predetermined threshold value is satisfied, and the optical axis adjustment section adjusts the optical axis based on the optical axis detection signal if the third condition is satisfied; and
    if the third condition is not satisfied, the optical axis adjustment section discontinues the optical axis adjustment.

14. An optical receiving method performed by an optical receiving device for receiving an optical signal transmitted via space as a medium, the method comprising:
    a condensing step of condensing the received optical signal;
    a step of transmitting a portion of the condensed optical signal that is aligned with an optical axis as transmitted light while deflecting another portion thereof that is not aligned with the optical axis as deflected light;
    a signal light receiving step of receiving the transmitted light and performing a photoelectric conversion on the received light;
    a detection light receiving step of receiving the deflected light and performing a photoelectric conversion on the received light to thereby output a detection intensity signal that indicates an intensity of the deflected light;
    an optical axis detection step of detecting an optical axis misalignment based on the detection intensity signal to output an optical axis detection signal; and
    an optical axis adjustment step of performing an optical axis adjustment based on the optical axis detection signal.

15. An optical axis misalignment detection method performed by an optical receiving device for receiving an optical signal transmitted via space as a medium, the method comprising:
    a condensing step of condensing the received optical signal;
    a step of transmitting a portion of the condensed optical signal that is aligned with an optical axis as transmitted light while deflecting leak light caused by an optical axis misalignment as deflected light;
    a signal light receiving step of receiving the transmitted light and performing a photoelectric conversion on the received light;

a detection light receiving step of receiving the deflected light and performing a photoelectric conversion on the received light to thereby output a detection intensity signal that indicates an intensity of the deflected light; and an optical axis detection step of detecting an optical axis misalignment based on the detection intensity signal to output an optical axis detection signal.

* * * * *